United States Patent
Kosuge

[11] Patent Number: 5,836,157
[45] Date of Patent: Nov. 17, 1998

[54] TORQUE CONVERTER FOR MOTOR VEHICLE

[75] Inventor: Hideaki Kosuge, Fuji, Japan

[73] Assignee: Jatco Corporation, Japan

[21] Appl. No.: 985,340

[22] Filed: Dec. 4, 1997

[30] Foreign Application Priority Data

Dec. 5, 1996 [JP] Japan ................................. 8-340549

[51] Int. Cl.$^6$ .................................................. F16D 33/00
[52] U.S. Cl. ............................................. 60/362; 60/361
[58] Field of Search ............................ 60/361, 362, 365

[56] References Cited

U.S. PATENT DOCUMENTS

| | | | |
|---|---|---|---|
| 2,393,470 | 1/1946 | Jandasek | 60/362 |
| 2,917,001 | 12/1959 | Zeidler et al. | 60/362 |
| 3,167,917 | 2/1965 | Alexandrescu | 60/361 |
| 4,009,571 | 3/1977 | Black et al. | 60/361 |
| 5,522,220 | 6/1996 | Locker | 60/361 |
| 5,640,849 | 6/1997 | Abe et al. | 60/362 |

FOREIGN PATENT DOCUMENTS 859955  1/1961  United Kingdom ..................... 60/362

*Primary Examiner*—F. Daniel Lopez
*Attorney, Agent, or Firm*—Rossi & Associates

[57] ABSTRACT

A vehicle torque converter for forming a circulation path of an oil and transmitting a rotary torque is provided which includes an impeller, turbine and stator, each having a plurality of blades. Each blade of the stator is divided into a radially inner half portion and a radially outer half portion in a radial direction of the circulation path. The radially inner half portion has a front edge that is set back from a front edge of the radially outer portion, and is inclined with respect to a direction of a rotation axis of the torque converter by a larger angle than the radially outer half portion.

9 Claims, 13 Drawing Sheets

TORQUE CONVERTER FOR MOTOR VEHICLE

BACKGROUND OF THE INVENTION

1. Field of the Invention

The present invention relates to the structure of a torque converter used in a power transmission system of a motor vehicle.

2. Description of the Prior Art

As known in the art, a torque converter is principally constructed to have three wheels, namely, an impeller, a turbine and a stator, and its interior is filled with an oil. The impeller that is connected to an input shaft of the torque converter converts rotary force from the engine into flow of the oil, and the turbine that is connected to an output shaft of the converter receives the flow of the oil and converts it into torque. In the meantime, the stator changes the direction of flow of the oil from the turbine, so as to perform a function of increasing the transmitted torque.

Since the oil is a transmitting medium that circulates between the input side and output side of the torque converter, the impeller and turbine connected to the input and output shafts of the converter are allowed to slide relative to each other, to function as a clutch so as to make it easy for the vehicle to be started, and absorb shocks. Due to these advantages as well as the above-described torque increasing function, torque converters are widely used in passenger cars and other types of motor vehicles. On the other hand, there has been a strong demand for reduction of the size of the torque converter, in order to permit the converter to be installed on a front drive vehicle, or incorporate a lockup clutch mechanism, for example. To this end, many torque converters have a reduced axial dimension, and assume a flat shape as seen in its cross section. Thus, the torque converter has been desired to improve its performance while meeting the demand for reduction in the size.

FIG. 13 and FIG. 14 are views schematically showing the flow of an oil in a torque converter. As shown in FIG. 13, a stator 53 serves to change the direction of flow of the oil so as to cause an impeller 51 to be further rotated, thereby to increase the torque as described above. Thus, a large torque ratio t (=torque of output shaft/torque of input shaft) can be obtained where the speed ratio of the output shaft to the input shaft (rotating speed of the output shaft/rotating speed of input shaft) is small.

As the speed ratio approaches 1 where the impeller 51 and turbine 52 are rotated at substantially the same speed, the direction of flow of the oil into the stator 53 is changed, causing a reverse effect. In this case, therefore, the stator is brought into an idling condition by means of a one-way clutch, so as not to reduce the torque ratio. As a result, the oil flows into and out of the stator 53 in substantially the same direction, as shown in FIG. 14. Since the stator does not exert a force to change the flow direction, it does not perform the torque increasing function. This point of operation is called "coupling point".

The performance of the torque converter may be represented by the above-indicated speed ratio e, torque ratio t, transmission efficiency $\eta$(=horse power of the output shaft/horse power of the input shaft) and torque capacity T (=required torque for the rotating speed of the input shaft), which are indicated by operating characteristic curves as shown in FIG. 15. When the speed ratio e is in a region smaller than the coupling point, the torque converter performs its torque increasing function, so that the torque ratio exceeds 1, and reaches its maximum of about 2 upon stalling when the output shaft is stopped. With the torque thus increased, the transmission efficiency $\eta$ reaches its maximum just before the coupling point.

During normal running of the vehicle, in general, the torque converter operates in a region where the speed ratio is larger than that of the coupling point. When a large accelerating force is needed as in the case where the vehicle is being started or accelerated to pass another vehicle, the torque converter operates in a region in which the speed ratio is small, so as to provide the torque increasing function. However, the actual frequency of use of each region is also influenced by the torque capacity.

The torque capacity represents torque that can be received at a certain rotating speed. If this torque capacity is small, the frequency of use of a region having a relatively large torque ratio is increased with a result of improved accelerating performance, but the fuel economy is deteriorated. If the torque capacity is large, on the other hand, the frequency of use of a region having a relatively high transmission efficiency is increased, but the accelerating performance is deteriorated.

Changes in the direction of flow of the oil toward each blade of the stator will be now described. Upon stalling (when the speed ratio e is equal to zero), the oil flows from the front side (concave side) of a blade 53A of the stator as indicated by arrow Na in FIG. 16, and the direction of flow of the oil can be changed by the maximum angle. When the speed ratio varies until it reaches the coupling point, the oil flows into and out of the stator by substantially the same angle as indicated by arrow Nc in FIG. 16. When the speed ratio is further increased to be close to 1, the flow of the oil hits the rear face (convex face) of the blade 53A as indicated by arrow Nd in FIG. 16, and the stator is brought into an idling condition. During these changes in the direction of flow of the oil, the oil flows most smoothly at a point where the direction of flow of the oil into the stator coincides with the inlet angle of the blade as indicated by arrow Nb in FIG. 16, assuring the maximum transmission efficiency.

To improve the performance of the torque converter, the flow rate of the circulating oil needs to be increased, and the coupling point needs to be shifted as much as possible to the higher speed region where the larger speed ratio is obtained.

The larger the speed ratio at the coupling point, the larger angle the flow of the oil from the turbine 52 to the stator 53 makes relative to the rotation axis R of the turbine at the coupling point. Namely, the direction of flow of the oil is close to the circumferential direction. Therefore, each blade 53A of the stator needs to be oriented so as lie in the circumferential direction, to receive the flow of the oil smoothly.

If the blade 53A of the stator lies in the circumferential direction, however, the angle of the blade relative to the flow of the oil into the stator is increased upon stalling, as shown in FIG. 17, and the problem of flow separation occurs. As a result, the effective flow path area is reduced, and the flow rate of the circulating oil is lowered, resulting in reduction in the torque capacity coefficient. If the blade of the stator is formed into a thin, wing-like shape so as to increase the area of the flow path, the flow separation at the time of stalling is more likely to occur. To avoid this, the number of blades may be increased to such an extent that does not significantly reduce the area of the flow path, so as to reduce the burden of each blade. In this case, however, the stator with the increased number of blades cannot be separated from a mold in the axial direction but must be separated in the radial direction, resulting in a more complicated manufacturing process and increased manufacturing cost.

Although the stator may be formed as a variable structure so that the angle of its blades is changed depending upon operating conditions, the structure becomes more complicated, resulting in reduced operating reliability and increased cost.

Since the torque converter often has a flat shape in cross section, to be thus small-sized as described above, flow separation tends to occur at portions where the flow of the oil is suddenly changed in direction, as indicated by x, y in FIG. 18, which also results in reduction in the effective flow path area and reduced torque capacity.

SUMMARY OF THE INVENTION

It is therefore an object of the present invention to provide a torque converter for a motor vehicle, wherein flow separation is avoided while the size of the converter is reduced, and the torque ratio is increased upon stalling and the transmission efficiency is improved during normal running.

To accomplish the above object, the present invention provides a torque converter for a motor vehicle, comprising an impeller, a turbine, and a stator, for forming a circulation path of an oil and transmitting a rotary torque, each of the impeller, turbine and stator having a plurality of blades, wherein each blades of the stator is divided into a radially inner half portion and a radially outer half portion in a radial direction of the circulating path, and wherein the radially inner half portion has a front edge that is set back or staggered rearward from a front edge of the radially outer portion, and is inclined with respect to a direction of a rotation axis of the torque converter by a larger angle than the radially outer half portion.

It may further comprise means for regulating an oil flow so as to suppress flow separation at said radially inner half portion.

In one preferred form of the invention, the radially inner half portion has a smaller thickness than the radially outer half portion, and a stepped portion is formed on a concave side of each blade, at a boundary between the radially inner half portion and the radially outer half portion. The boundary is preferably formed as a curved surface that extends substantially along a center line of the circulation path.

In another preferred form of the invention, each blade of at least one of the impeller and turbine has a radially inner half portion, a radially outer half portion, and a boundary fence that extends along the circulation path and separates the radially inner half portion and radially outer half portion from each other. The boundary fence may be formed as a stepped portion that rises from the radially inner half portion of each blade to the radially outer half portion, so that the radially outer half portion is offset from the radially inner half portion.

In the torque converter constructed as described above according to the present invention, the front edge of the radially outer half portion of each blade of the stator points to the direction of the rotation axis of the converter as compared with the front edge of the radially inner portion, to deal with the flow of the oil in the radially outer portion of the circulation path that determines the operating characteristics of the converter upon stalling. Accordingly, the flow separation is less likely to occur, and a large stall torque ratio and a large torque capacity can be obtained without reducing the effective flow path area. Further, the radially inner half portion of the stator blade makes a relatively small angle with respect to the circumferential direction of the circulation path in the large speed ratio region, whereby the coupling point is shifted to the higher speed side, and the transmission efficiency is improved.

In the arrangement in which means for regulating an oil flow is provided, flow separation can be mostly prevented, thus, the effective flow path area is maintained and high torque capacity is obtained.

In the arrangement in which the radially inner half portion has a smaller thickness than the radially outer half portion, and a stepped portion is formed at the boundary between the radially inner half portion and the radially outer half portion, the stepped portion functions as a wall for regulating or rectifying the flow of the oil, thereby to prevent flow separation which would otherwise occur at the radially inner half portion.

In the arrangement in which each blade of the impeller or turbine is provided with a boundary fence that separates its radially inner half portion and radially outer half portion from each other as described above, flow separation can be mostly prevented due to the flow regulating function of the boundary fence, and, even if flow separation occurs in a radially inner portion of the circulation path where the flow direction is suddenly changed, the turbulent flow due to the flow separation does not reach a radially outer portion of the circulation path.

If the above-indicated boundary fence is formed as a stepped portion that rises from the radially inner half portion of each blade of the impeller or turbine to the radially outer half portion, so that the radially outer portion is offset from the radially inner portion, the boundary fence can be easily formed by press stamping. In this case, the rigidity of the blades is also improved.

BRIEF DESCRIPTION OF THE DRAWINGS

The invention will be described in greater detail with reference to certain preferred embodiments thereof and the accompanying drawings, wherein.

DETAILED DESCRIPTION OF THE PREFERRED EMBODIMENTS

Figure 1:
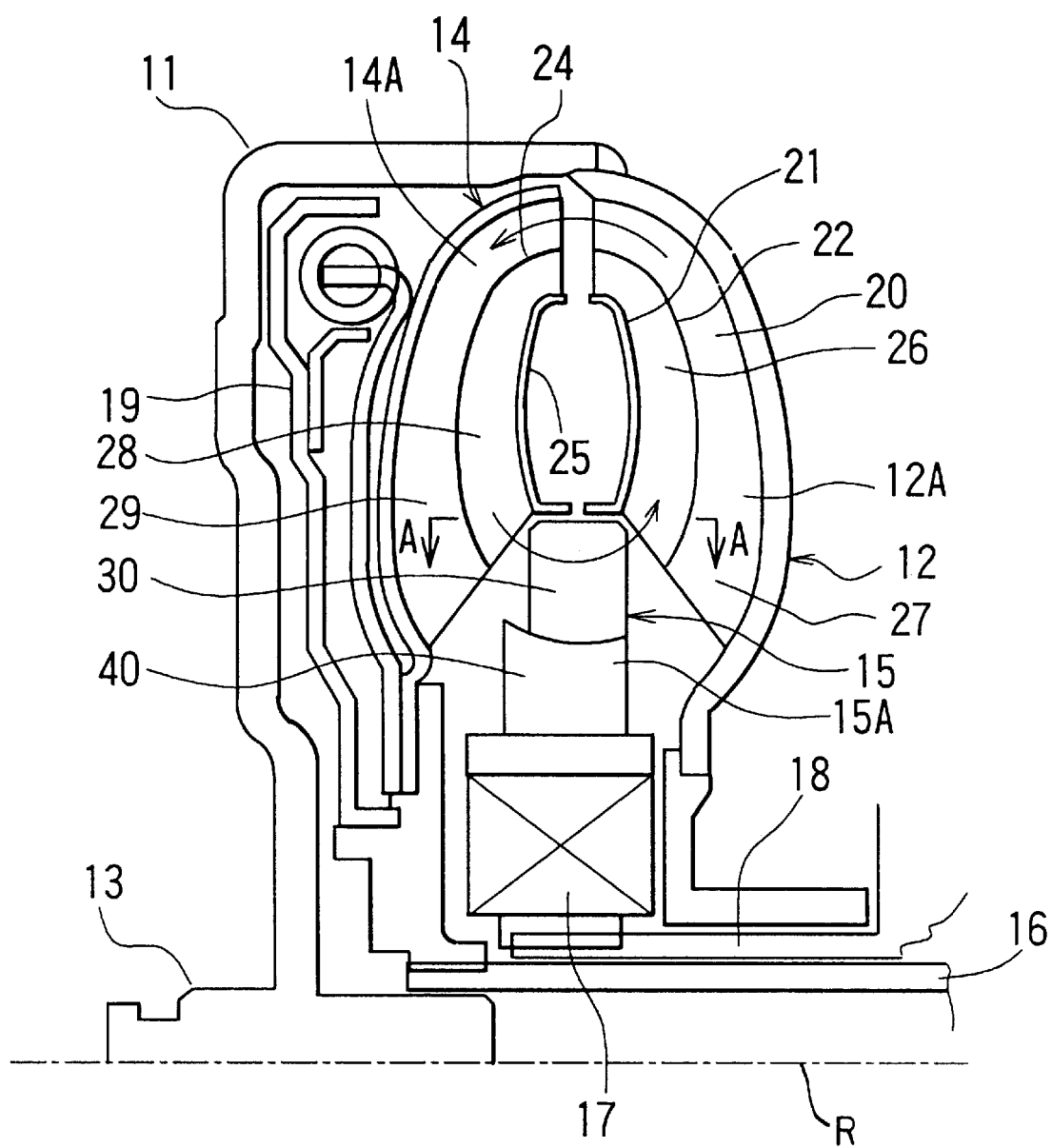
FIG. 1 is a vertical cross sectional view showing the construction of one embodiment of the present invention.

FIG. 1 is a vertical cross sectional view showing the construction of one embodiment of the invention. A converter shell 11 is rotatably supported by a support shaft 18 provided on the side of a transmission case, and an impeller 12 is fixed to the converter shell 11. The output of an engine (not shown) is transmitted to an input shaft 13 of the converter shell 11. A turbine 14 is also disposed in the converter shell 11 such that its oil inlet side faces the oil outlet side of the impeller 12 in a radially outer portion of the converter shell 11. This turbine 14 is coupled to an input shaft 16 of a transmission that serves as an output shaft of the torque converter.

In a radially inner portion of the converter shell 11, a stator 15 is disposed between the oil outlet side of the turbine 14 and the oil inlet side of the impeller 12. The stator 15 is supported by the support shaft 18 via a one-way clutch 17. Blades of the impeller 12, turbine 14 and stator 15 have basic three-dimensional shapes known in the art. Thus, a circulation path is formed through which an oil flows in the direction of arrows in FIG. 1 when the impeller 12 is rotated.

Cores 21, 25 are fixed to the impeller 12 and turbine 14, respectively, so as to increase the rigidity with which each blade array is mounted, and partially define the oil circulation path 20. In the embodiment of FIG. 1, a lockup clutch mechanism 19 is provided in the converter shell 11. The impeller 12 and turbine 14 are formed in flat shape so that the lockup clutch 19 can be housed in the converter shell 11 without increasing the axial length of the torque converter.

Each blade 15A of the stator 15 is divided in its radial direction into two sections each having an approximately half size of the blade. These two sections will be called a radially inner half portion 30 and a radially outer half portion 40 as viewed in the circumferential direction of the oil circulation path. The boundary of the radially inner half portion 30 and radially outer half portion 40 is formed as a curved surface that substantially extends along the center line of the oil circulation path shown in the vertical cross section of FIG. 1.

Figure 2:
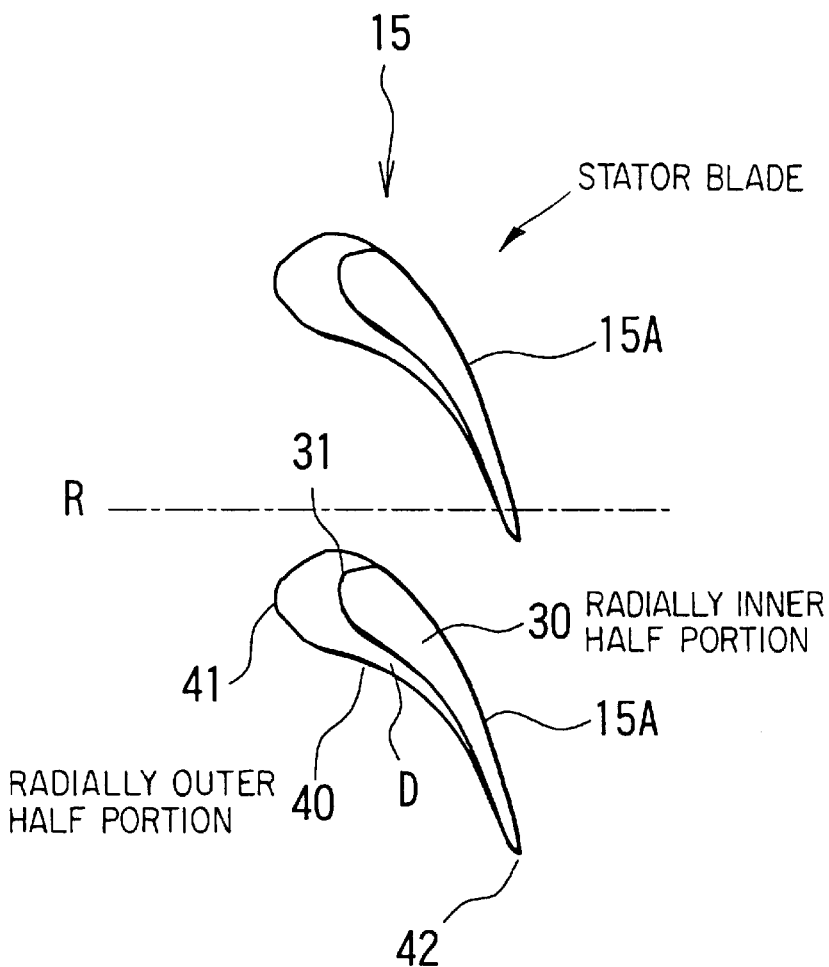
FIG. 2 is an enlarged view of stator blades as seen in the direction of arrows A—A.

FIG. 2 is an enlarged view of blades 15A of the stator 15 as seen in the direction of arrows A—A in FIG. 1. The radially outer half portion 40 has a front edge 41 that points to the same direction as the rotation axis R (input shaft 16) of the converter, and a rear edge 42 that is inclined toward the direction of rotation of the impeller 12. Thus, the radially outer half portion 40 has a wing-like shape with a certain camber for changing the direction of flow of the oil. On the other hand, the radially inner half portion 30 has a front edge 31 that is set back or staggered rearward from the front edge 41 of the radially outer half portion 40, and its rear face (convex face) extends along the curve of the rear face of the radially outer half portion. The radially inner half portion 30 has a smaller thickness than the radially outer half portion 40. Thus, the radially inner half portion 30 makes a smaller angle relative to the circumferential direction of the oil circulation path than the radially outer half portion 40. The blade 15A also has a dog-tooth-like stepped portion D formed on its front face (concave face).

Figure 3:
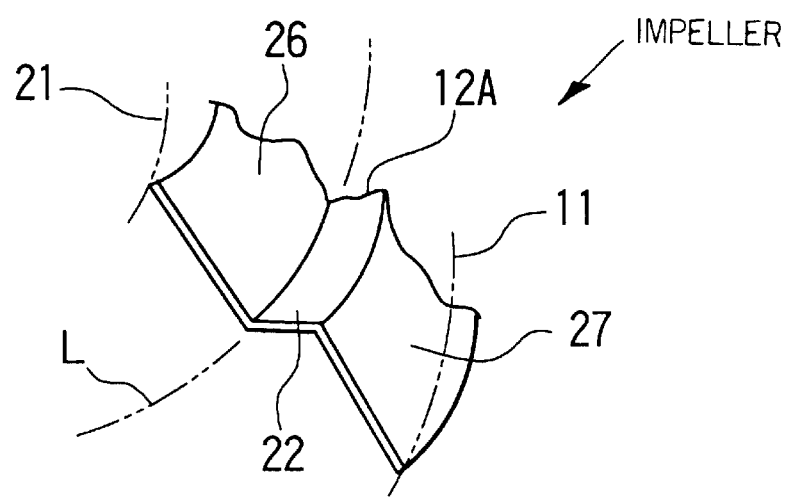
FIG. 3 is a cross sectional view showing a boundary stepped portion of a blade of an impeller.

Further, each blade 12A, 14A of the impeller 12 and turbine 14 has a boundary stepped portion 22, 24 that extends in the direction of flow of the oil, substantially along the center line of the oil circulation path in the vertical cross section of FIG. 1. As shown in FIG. 3, each blade of the impeller 12 and turbine 14 has a radially inner half portion 26, 28 from which the boundary stepped portion 22, 24 rises on the front side (concave side) of the blade, up to a radially outer half portion 27, 29. Thus, the stepped portion 22, 24 functions as a boundary fence for offsetting the radially outer half portion 27, 29 with respect to the radially inner half portion 26, 28 in the circulation path 20. Such boundary stepped portions 22, 24 are formed when the impeller 12 and turbine 14 are formed by press stamping.

The operation of the torque converter constructed as described above will be now described. The flow rate of the circulating oil through the stator 15 is maximized in a torque increasing region, particularly when the vehicle is stalled with the speed ratio being zero. At this time, the flow speed is naturally greater in the radially outer portion of the circulation path, and therefore the flow of the oil through the radially outer portion of the stator substantially determines its operating characteristics. Since the front edge 41 of the radially outer half portion 40 of each stator blade 15A points to the direction of the rotation axis as compared with the front edge 31 of the radially inner half portion 30, flow separation does not occur even if the oil flows from the turbine 14 onto the front side of the blade 15A with a large angle relative to the rotation axis, as indicated by the arrow Ma in FIG. 4.

Also, the front edge 31 of the radially inner half portion 30 is set back from the front edge 41, and the thickness of this portion 30 is reduced, so that the dog-tooth-like stepped portion D is formed at the boundary between the radially inner half portion 30 and the radially outer half portion 40. Thus, even if flow separation is about to occur at the radially inner half portion 30, the dog-tooth-like stepped portion D provides a wall to regulate the flow of the oil, thereby to avoid the flow separation. Accordingly, a large stall torque ratio and a large torque capacity can be achieved without reducing the effective flow path area.

Figure 4:
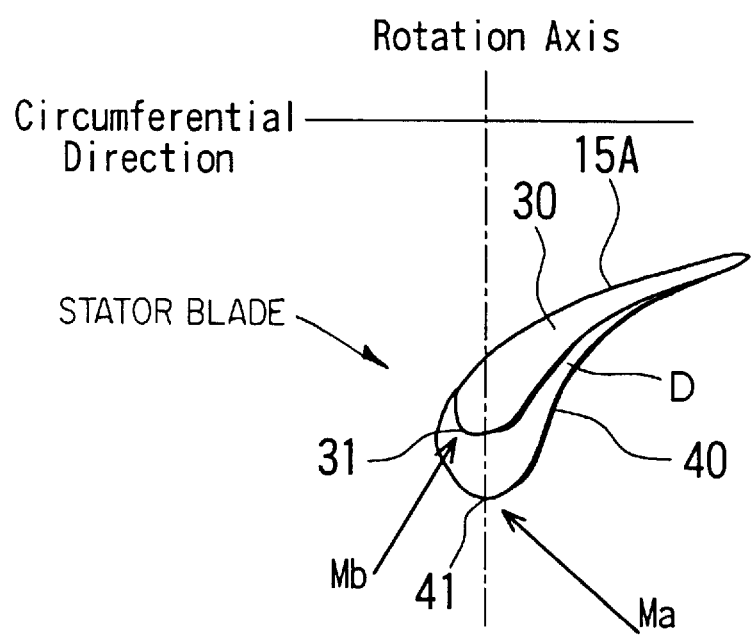
FIG. 4 is an explanatory view showing the state of flow of an oil onto a blade of a stator.

While the torque converter reaches the coupling point as the speed ratio increases, the coupling point itself is located on the higher speed side compared to that of a known converter, since the radially inner half portion 30 of the stator blade 15A makes a smaller angle with respect to the circumferential direction, which leads to smooth flow of the oil from the turbine 14 as indicated by the arrow Mb in FIG. 4, with a result of improved transmission efficiency.

Figure 5:
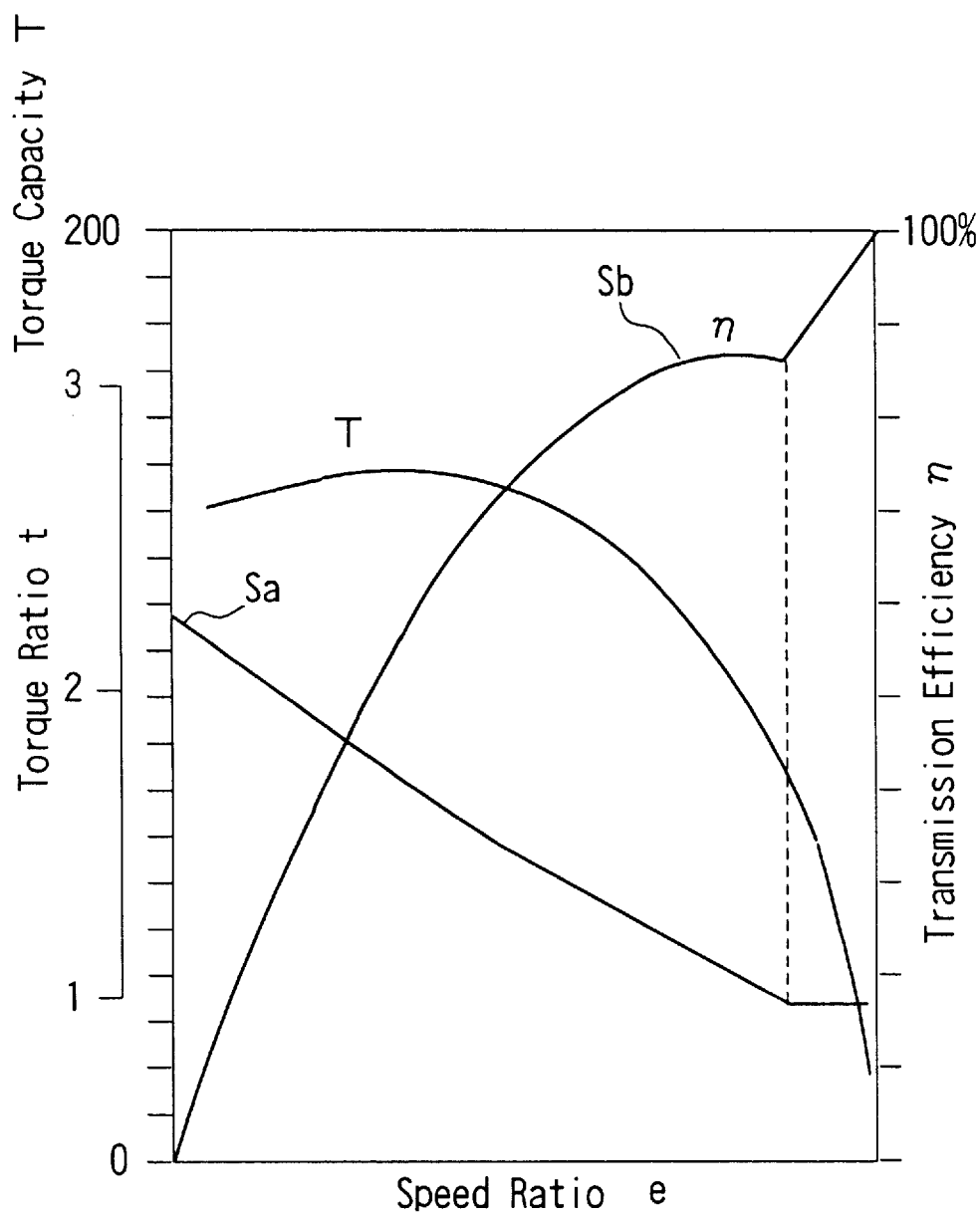
FIG. 5 is a graph showing operating characteristic curves of the present embodiment.

The torque converter of the present embodiment exhibits operating characteristic curves as shown in the graph of FIG. 5. As is understood from this graph, an improved transmission efficiency as indicated by Sb is achieved while assuring a sufficiently large stall torque ratio as indicated by Sa.

Figure 6:
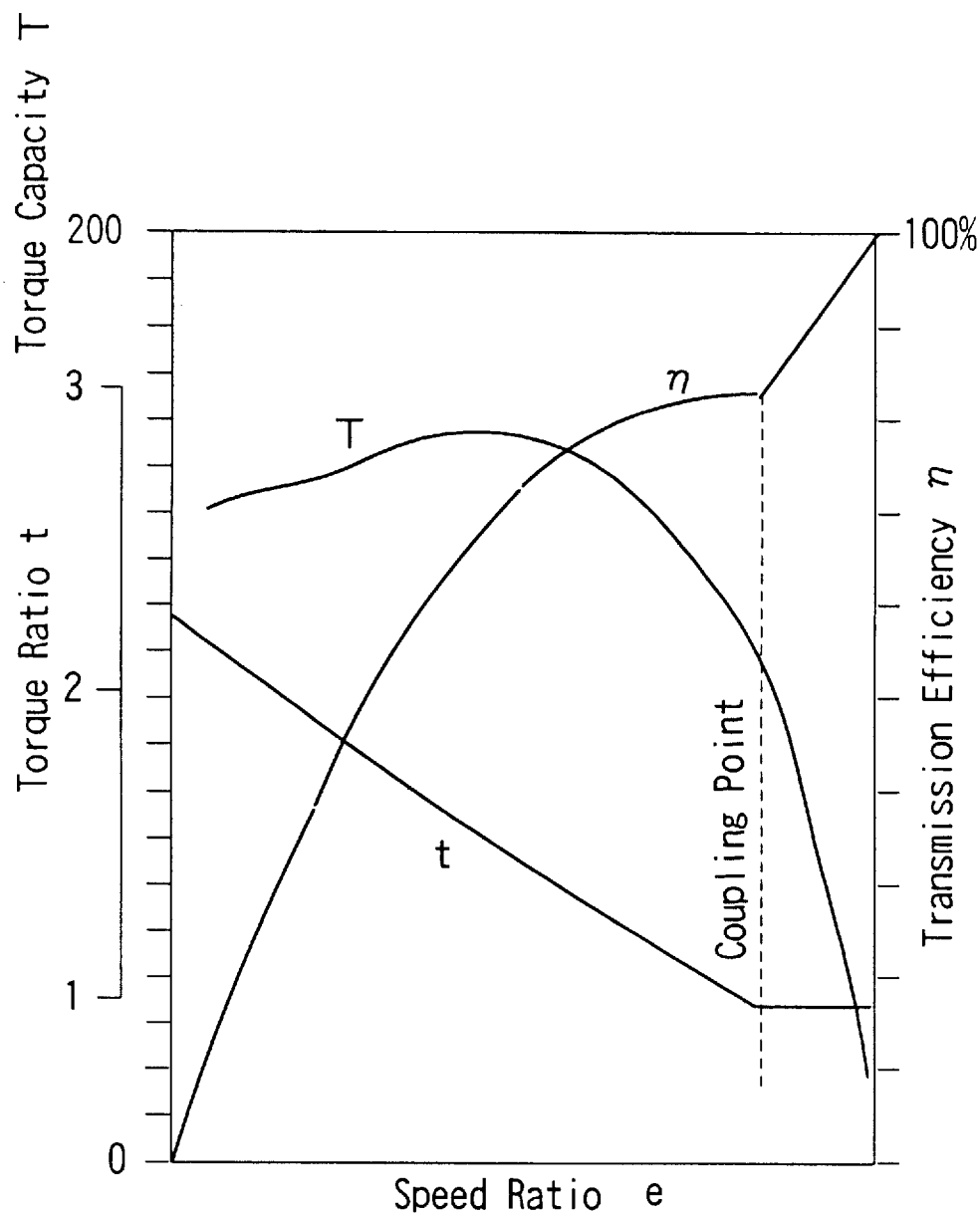
FIG. 6 is a graph showing operating characteristic curves of a known example in which a whole blade has the same shape as a radially outer half portion of the blade of the present embodiment.
Figure 7:
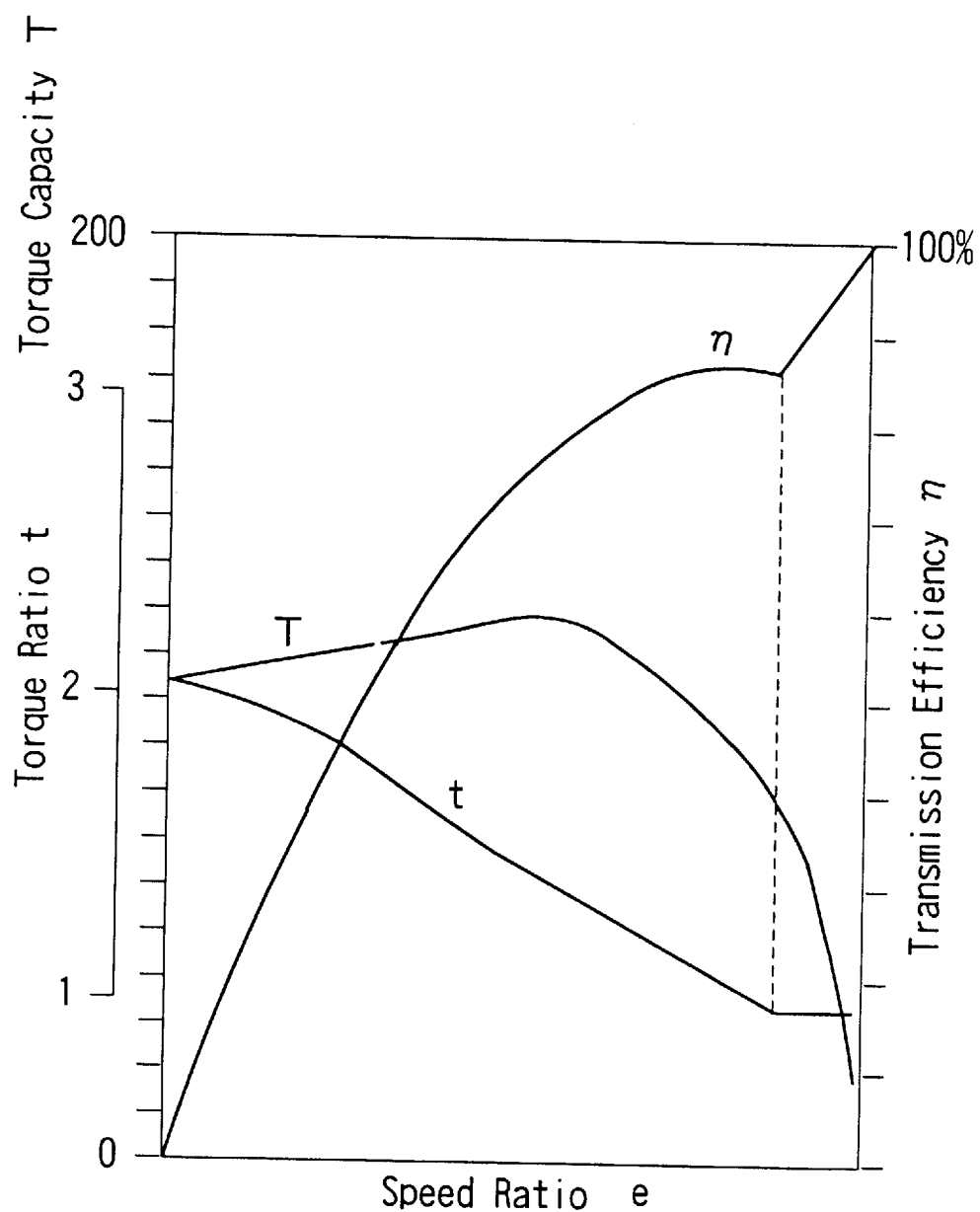
FIG. 7 is a graph showing operating characteristic curves of another known example in which a whole blade lies in the circumferential direction of a circulation path.
Figure 8:
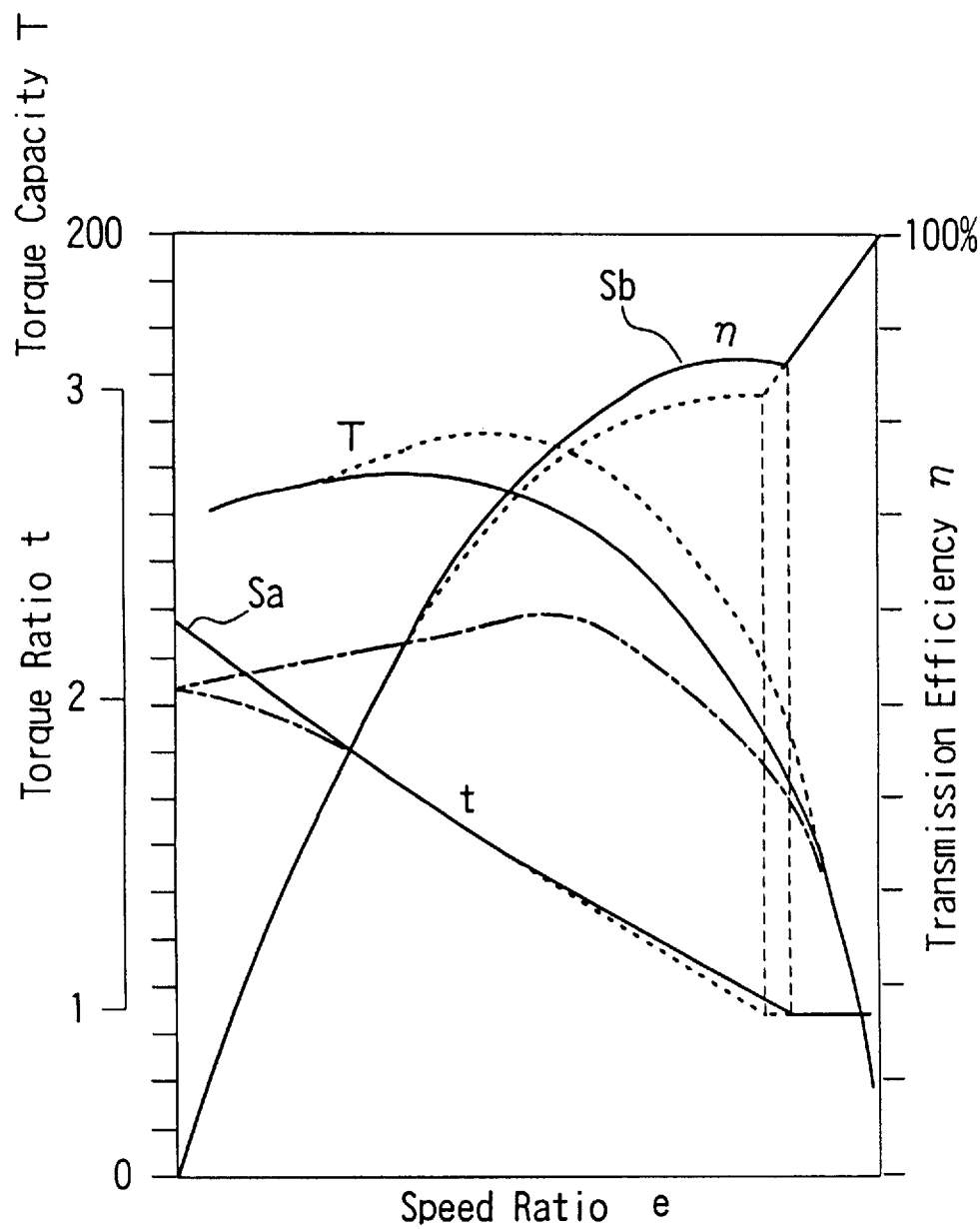
FIG. 8 is a graph showing operating characteristic curves of the present embodiment and known examples for comparison.

The graph of FIG. 6 shows operating characteristic curves of a known prior art example in which each blade of the stator as a whole has the same shape as the radially outer portion of the stator blade of the present embodiment, and FIG. 7 shows operating characteristic curves of another known prior art example wherein each blade of the stator as a whole extends substantially in parallel with the circumferential direction of the circulation path. FIG. 8 shows characteristics of the present embodiment and the known examples, wherein solid lines are operating characteristic curves of the present embodiment, and one-dot chain lines are operating characteristic curves of the known example in which each blade as a whole substantially lies in the circumferential direction, while dotted lines are operating characteristic curves of the known example in which each blade as a whole has the same shape as the radially outer portion of the stator blade of the present embodiment.

In the impeller 12 and the turbine 14, flow separation may occur due to their flat shapes, at the inlet portions of the impeller 12 and turbine 14 where the flow path is suddenly changed in direction. Even in this case, a speed component is prevented from arising in the direction from the radially inner portion to the radially outer portion, owing to the flow regulating function of the boundary stepped portions 22, 24 as boundary fences that are formed to extend in the flow direction, thus avoiding occurrence of flow separation. Even in the case where separation occurs at the edges of the radially inner portions, turbulent flow due to such separation does not reach the radially outer half portion 27, 29. Accordingly, the impeller 12 and turbine 14 having generally flat shapes assure sufficiently large torque ratio and large torque capacity, without reducing the effective flow path area.

In the present embodiment constructed as described above, each blade of the stator 15 is divided into the radially inner half portion 30 and radially outer half portion 40, such that the front edge 41 of the radially outer half portion 40 points to substantially the same direction as the rotation axis of the converter as compared with the front edge 31 of the radially inner half portion 30, and such that the front edge 31 of the radially inner portion 30 is set back from the front edge 41 of the radially outer portion 40. Also, the thickness of the inner portion 30 is reduced. The torque converter with the stator thus constructed provides a high transmission efficiency in a region of large speed ratios, while assuring large stall torque ratio and large torque capacity.

With the impeller 12 and turbine 14 provided with the boundary fences (stepped portions) extending in the flow direction, flow separation is prevented from occurring at portions where the flow path is suddenly changed in direction, owing to the flow regulating function of the boundary fences. Accordingly, the axial length of the torque converter can be further reduced while assuring desired torque ratio and torque capacity. Further, since the boundary fences are provided by forming stepped portions by press stamping, the rigidity of the blades as a whole is also improved.

Figure 9:
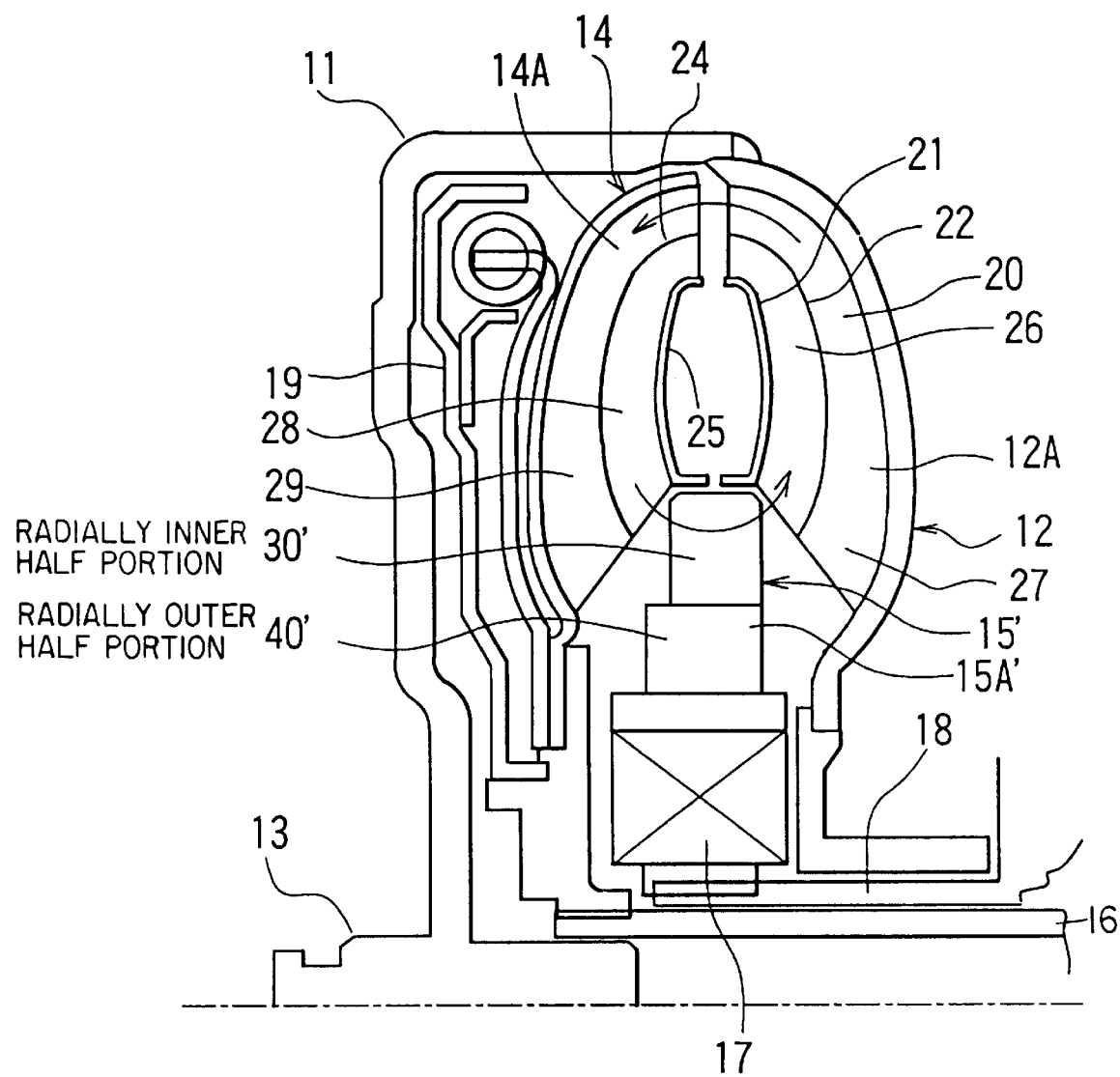
FIG. 9 is a vertical cross sectional view showing the construction of the second embodiment of the present invention.

FIG. 9 is a vertical cross sectional view showing the second embodiment of the present invention. In this embodiment, the shape of each blade of a stator 15' is different from that of the stator 15 of the previous embodiment. More specifically, each blade 15A' of the stator 15' is shaped such that the boundary of its radially inner half portion 30' and radially outer half portion 40' in the circulation path extends in parallel with the rotation axis of the converter. The other parts of this embodiment are constructed in the same manner as in the first embodiment shown in FIG. 1. The stator with the blades 15A' thus shaped can be easily separated from a mold when it is formed by resin molding or casting.

Figure 10:
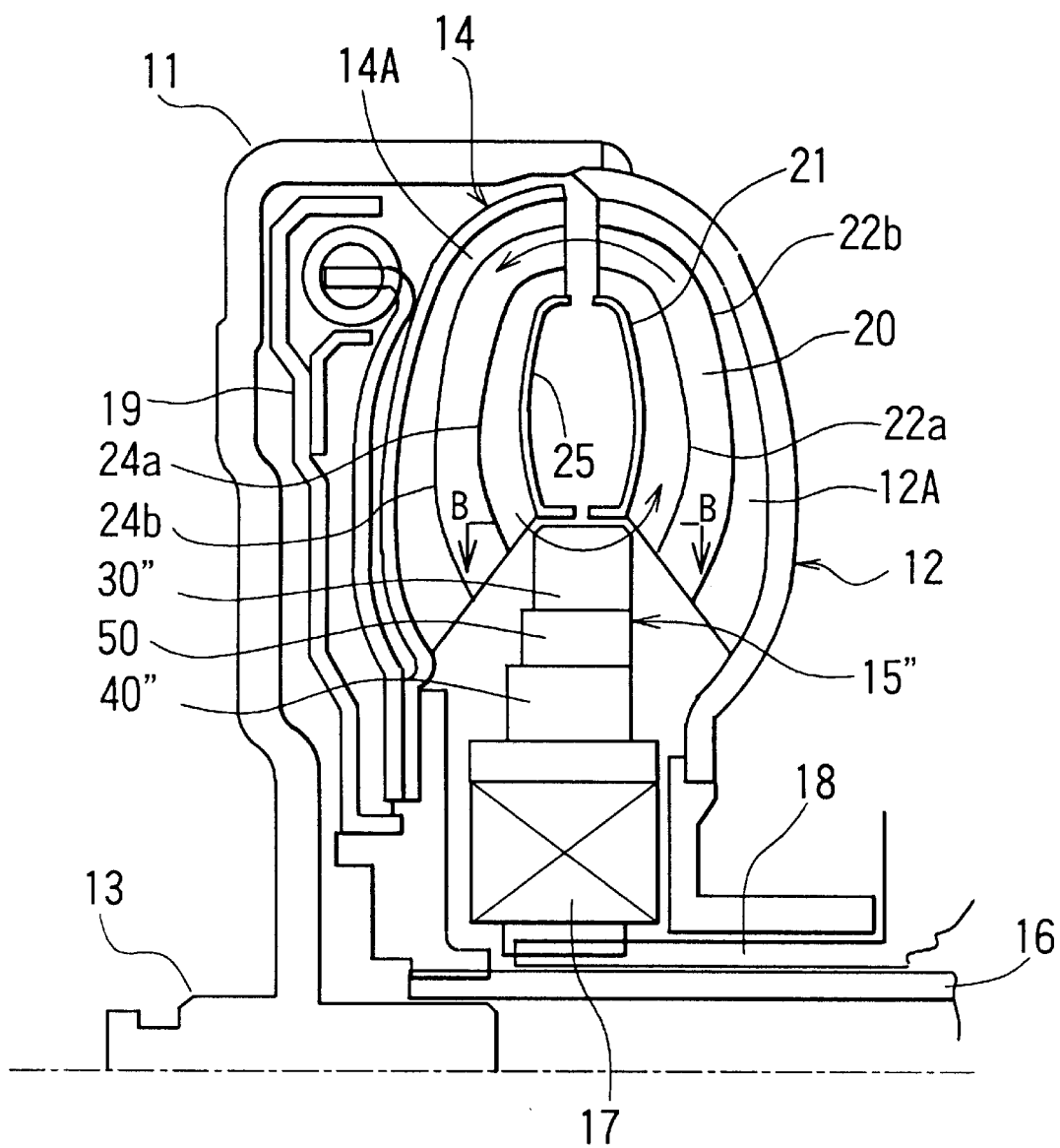
FIG. 10 is a view showing a modified example of the second embodiment.
Figure 11:
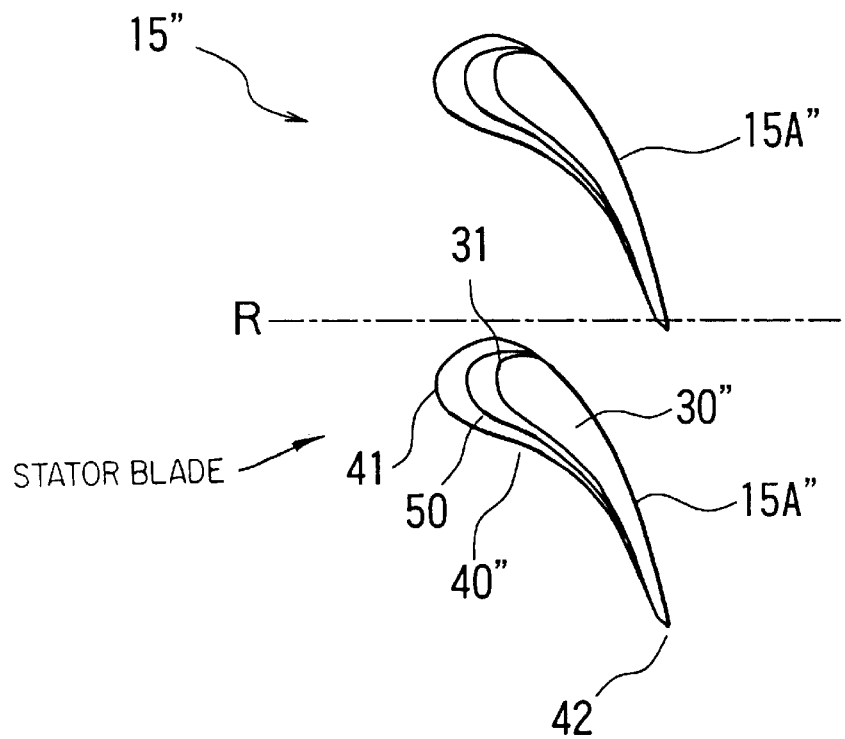
FIG. 11 is an enlarged view of stator blades as seen in the direction of arrows B—B in FIG. 10.

While each blade of the stator, impeller and turbine is divided into a radially inner portion and a radially outer portion in the oil circulation path in the illustrated embodiments, the present invention is not limited to this arrangement, but each blade may be divided into three or more sections. FIG. 10 and FIG. 11 show a modified example of the second embodiment wherein each blade is divided into three sections. For example, each blade 15A" of a stator 15" consists of a radially inner portion 30", middle portion 50, and a radially outer portion 40" that are arranged in the radial direction of the circulation path. An impeller 12" and a turbine 14" are formed with boundary stepped portions 22a, 22b and 24a, 24b, respectively. In this arrangement, the oil circulation path is divided into three flow paths, namely, a radially inner path, middle path, and a radially outer path.

Figure 12:
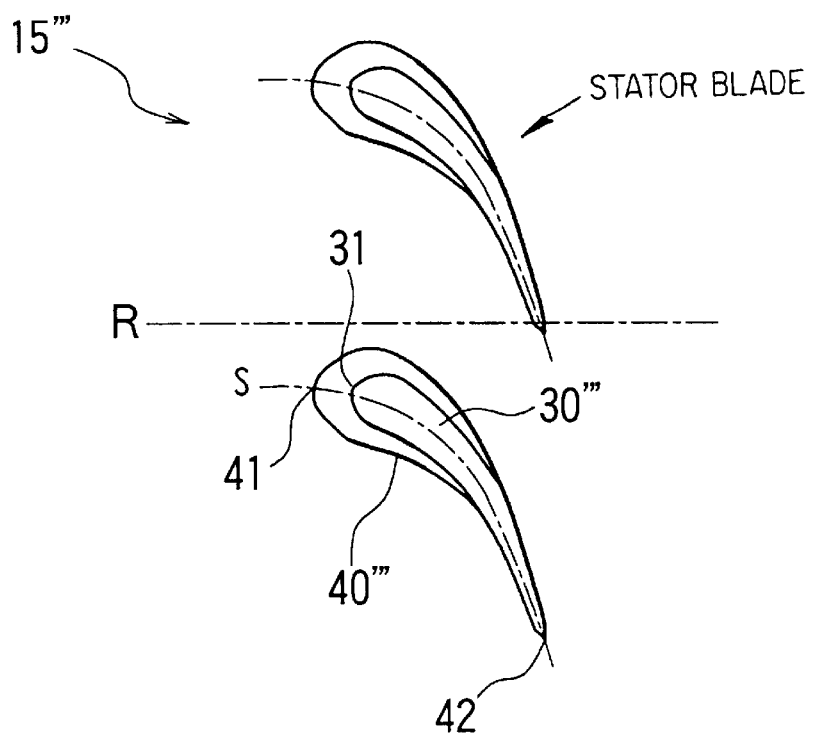
FIG. 12 is a view showing a modified example of the stator.
Figure 13:
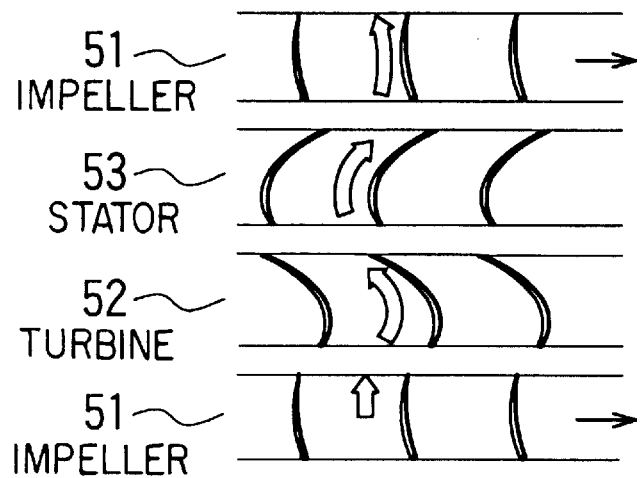
FIG. 13 is a view showing the state of flow of an oil in a torque increasing range.
Figure 14:
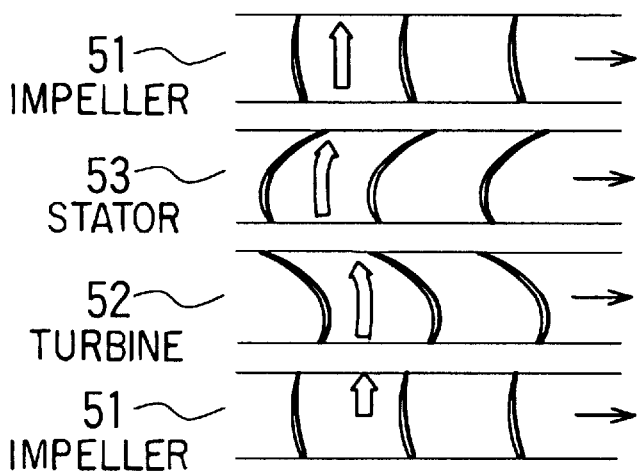
FIG. 14 is a view showing the state of flow of an oil when the speed ratio is around 1.
Figure 15:
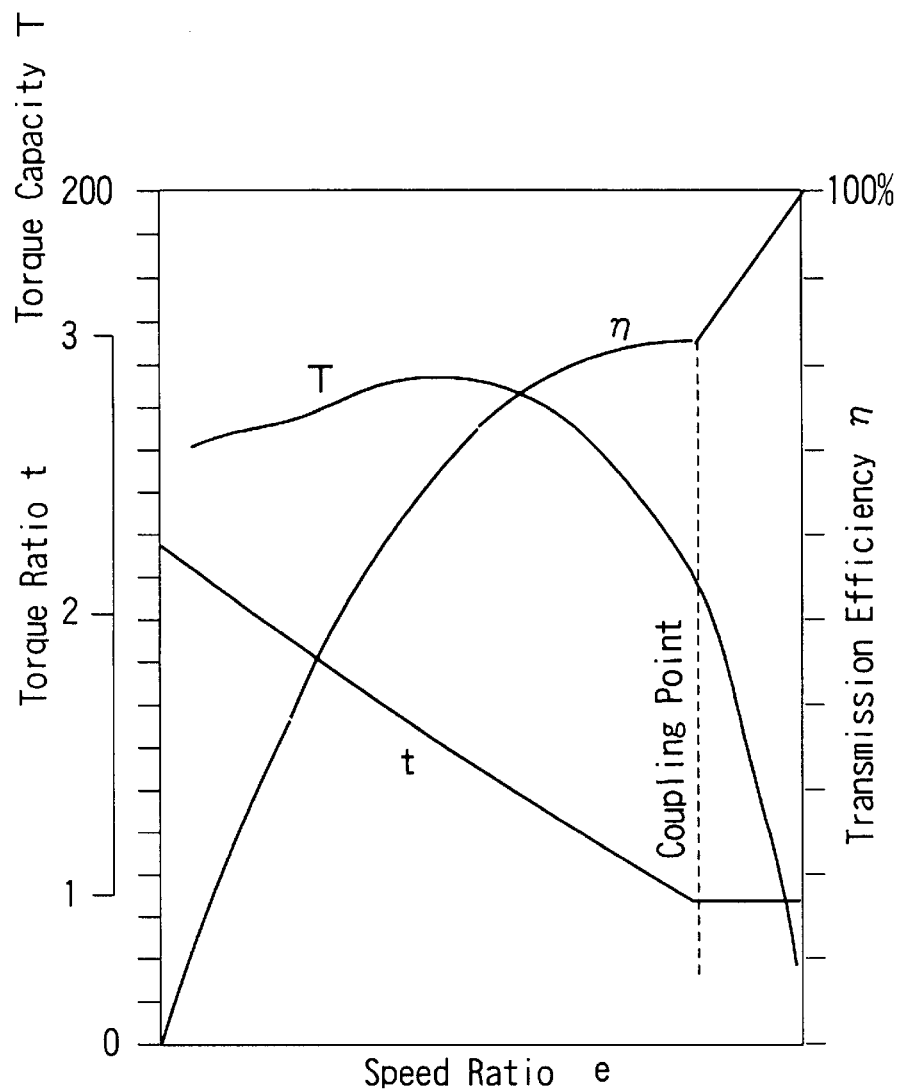
FIG. 15 is a view showing one example of operating characteristic curves of a torque converter.
Figure 16:
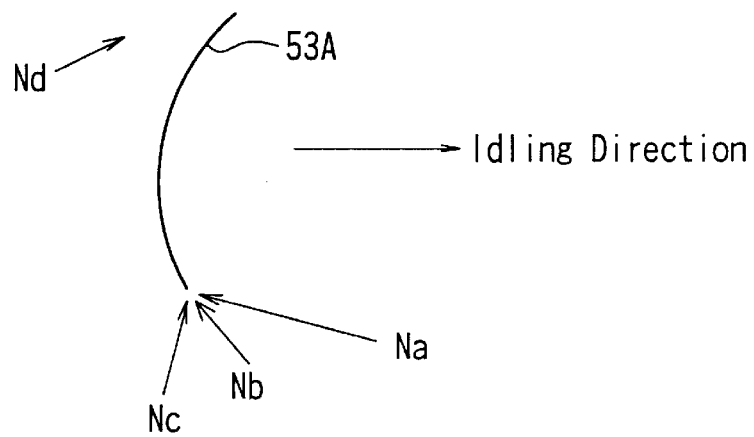
FIG. 16 is a view showing changes in flow of an oil onto a stator blade.
Figure 17:
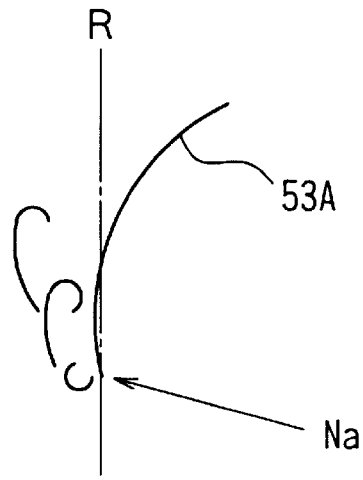
FIG. 17 is a view showing the state of flow of an oil when a stator blade lies in the circumferential direction.
Figure 18:
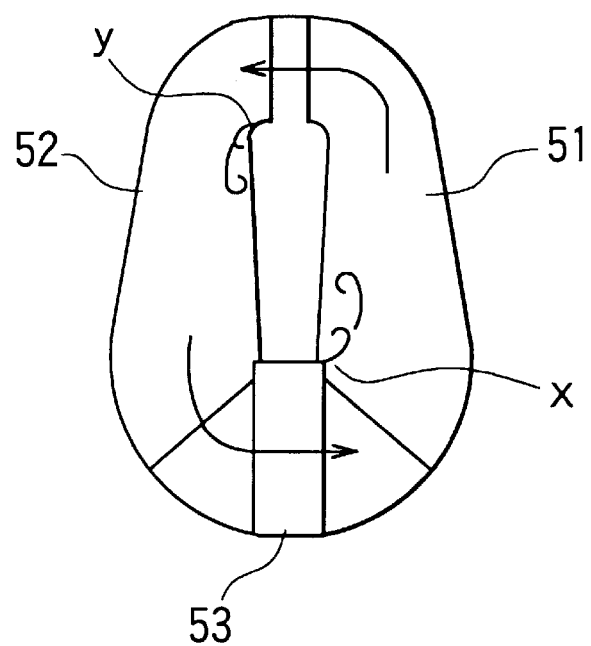
FIG. 18 is a view explaining occurrence of flow separation in a torque converter having a flat shape.

While the rear face (convex face) of the radially inner half portion of each blade of the stator extends along the curve of the rear face of the radially outer half portion in the illustrated embodiments, the present invention is not limited to this configuration. For example, a radially inner portion 30'" of the stator blade 15'" may be formed along the center line S of its radially outer portion 40'", as shown in FIG. 12.

In the torque converter constructed according to the present invention, each blade of the stator is divided into a radially inner half portion and a radially outer half portion in the radial direction of the circulation path, and the front edge of the radially inner half portion is set back or staggered rearward from that of the radially outer half portion, so that the inner half portion forms a larger angle relative to the rotation axis of the converter than the outer half portion. Accordingly, the radially outer half portion whose front edge points to the direction of the rotation axis rather than that of the radially inner half portion effectively changes the direction of flow of the oil upon stalling, without causing flow separation, and thus assures increased stall torque ratio and torque capacity. Further, the radially inner half portion of the stator blade is oriented so as to lie in the circumferential direction in the large speed ratio region, whereby the coupling point is shifted to the higher speed side, and the transmission efficiency is improved.

In one preferred form of the invention, the radially inner half portion has a smaller thickness than the radially outer half portion, and a stepped portion is formed at the boundary between the radially inner half portion and the radially outer half portion. In this case, the stepped portion serves as a wall for regulating or rectifying flow of the oil, so as to prevent flow separation which would otherwise occur at the radially inner half portion.

In another preferred form of the invention, each blade of the impeller or turbine is formed with a boundary fence that separates its radially inner half portion and radially outer half portion from each other. In this case, flow separation can be mostly prevented due to the flow regulating function of the boundary fence, and, even if flow separation occurs in a radially inner portion of the circulation path where the direction of flow is suddenly changed, turbulent flow due to the flow separation does not reach a radially outer portion of the circulation path. Thus, the torque converter can be small-sized by reducing the axial dimension thereof, without reducing the effective flow path area, while assuring sufficiently large torque ratio and torque capacity.

If the above-indicated boundary fence is formed as a stepped portion that rises from the radially inner half portion of each blade of the impeller or turbine to the radially outer half portion, so that the radially outer portion is offset from the radially inner portion, the blade and boundary fence can be easily formed by press stamping. In this case, the rigidity of the blades is also advantageously improved.

What is claimed is:

1. A torque converter for a motor vehicle, comprising an impeller, a turbine, and a stator, for forming a circulation path of an oil and transmitting a rotary torque, each of said impeller, said turbine and said stator having a plurality of blades;

wherein each of said plurality of blades of said stator is divided into a radially inner half portion and a radially outer half portion in a radial direction of the circulation path; and wherein said radially inner half portion has a front edge that is set back from a front edge of said radially outer half portion, and is inclined with respect to a direction of a rotation axis of the torque converter by a larger angle than said radially outer half portion.

2. A torque converter according to claim 1, further comprising means for regulating an oil flow so as to suppress flow separation at said radially inner half portion.

3. A torque converter according to claim 2, wherein said radially inner half portion has a smaller thickness than said radially outer half portion, and said means for regulating an oil flow includes a stepped portion formed on a concave side of said each blade, at a boundary between said radially inner half portion and said radially outer half portion.

4. A torque converter according to claim 3, wherein said stepped portion has a dog-tooth like shape.

5. A torque converter according to claim 3, wherein said boundary is formed as a curved surface that extends substantially along a center line of said circulation path.

6. A torque converter according to claim 3, wherein said boundary is formed in parallel with said rotation axis.

7. A torque converter according to claim 1, wherein each of said plurality of blades of at least one of said impeller and said turbine has a radially inner half portion and a radially outer half portion, and comprising means for regulating an oil flow so as to suppress flow separation at said radially inner half portion of said blades of at least one of said impeller and said turbine.

8. A torque converter according to claim 7, wherein said means for regulating an oil flow includes a boundary fence that extends along said circulation path and separates the radially inner half portion and radially outer half portion of said blades of at least one of said impeller and said turbine from each other.

9. A torque converter according to claim 8, wherein said boundary fence is formed as a stepped portion that rises from said radially inner half portion of said each blade to said radially outer half portion, so that said radially outer half portion is offset from said radially inner half portion.

* * * * *